(12) United States Patent
von Hellens

(10) Patent No.: US 6,794,452 B2
(45) Date of Patent: Sep. 21, 2004

(54) COVULCANIZATION OF POLYMERS

(75) Inventor: Carl Walter von Hellens, Bright's Grove (CA)

(73) Assignee: Bayer Inc., Ontario (CA)

( * ) Notice: Subject to any disclaimer, the term of this patent is extended or adjusted under 35 U.S.C. 154(b) by 0 days.

(21) Appl. No.: 10/197,299

(22) Filed: Jul. 15, 2002

(65) Prior Publication Data

US 2003/0092843 A1 May 15, 2003

(30) Foreign Application Priority Data

Jul. 31, 2001 (CA) .............................................. 2355578

(51) Int. Cl.$^7$ ............................ C08F 8/00; C08L 23/00; C08L 33/18; C08L 33/20; C08L 45/00
(52) U.S. Cl. ..................... 525/195; 525/196; 525/216; 525/222; 525/238; 525/239; 525/240
(58) Field of Search .................................. 525/195, 196, 525/216, 222, 239, 240, 238

(56) References Cited

FOREIGN PATENT DOCUMENTS

| EP | 1 111 003 A2 | * | 6/2001 |
| WO | 01/77185 | | 10/2001 |

* cited by examiner

Primary Examiner—Nathan M. Nutter
(74) Attorney, Agent, or Firm—Joseph C. Gil; Jennifer R. Seng

(57) ABSTRACT

Polymeric materials that differ from each other in solubility parameters and other properties are covulcanized by reaction with a hydrogenated carboxylated nitrile rubber, a multivalent salt of an organic acid and a curing agent.

18 Claims, No Drawings

COVULCANIZATION OF POLYMERS

FIELD OF THE INVENTION

The present invention relates to the covulcanization of polymeric materials. The present invention also relates to compositions comprising covulcanized polymeric materials.

BACKGROUND OF THE INVENTION

Many polymeric materials find applications that impose multiple performance requirements on physical properties such as, for instance, tensile strength, elasticity and abrasion resistance. Also, these applications require the material to be effective over a wide temperature range. It is known in the art to blend different polymers in an attempt to form a polymeric material having these desired properties. This is not always easy, especially if the two polymers will not mix and bond with each other. When this occurs, the resultant material has large domains of one polymer distributed in a continuous phase of the other polymer. In the absence of bonding between the two polymers, or if bonding occurs to only a limited extent, the discontinuous polymer does not contribute to the properties of the blend, and a product is formed that has low modulus and low tensile strength.

For example, ethylene/propylene rubber (EPR) is a copolymer of ethylene and propylene usually containing 50 to 75 parts of ethylene and the balance propylene. EPDM is a terpolymer of ethylene, propylene and a diene monomer, the diene monomer being hexadiene, dicyclopentadiene or, more commonly, ethylidene norbornene. EPR and EPDM both have good heat resistance, good cold resistance, good ozone resistance and good weather resistance. However, both have poor physical, abrasive and adhesive properties. Attempts have been made in the past to blend EPR or EPDM with other polymers, seeking to obtain a composition that has the good weather and temperature properties of EPR or EPDM and also good physical properties of the other polymer. Difficulty has been encountered in blending the EPR or EPDM and other polymers, resulting in compositions that display no useful enhancement of physical properties.

SUMMARY OF THE INVENTION

The present invention provides a method for covulcanizing two or more polymeric materials, which involves admixing the two or more polymeric materials with a hydrogenated carboxylated nitrile rubber (HXNBR), a multivalent salt of an organic acid and a vulcanizing agent.

The present invention also provides a composition containing two or more different polymeric materials that have been admixed with a hydrogenated carboxylated nitrile rubber, a multivalent salt of an organic acid and a vulcanizing agent.

DETAILED DESCRIPTION OF THE INVENTION

Different polymers have different solubility parameters. Solubility parameters correlate with polarity, and are measured in units of $(cal.cm^3)^{1/2}$. According to "The Elements of Polymer Science and Engineering", Academic Press Inc. 1982, by Alfred Rudin, Chapter 12 Polymer Mixtures, pages 428 to 445, nitrile rubber having a 43% acrylonitrile content, for example, has a solubility parameter of 10.53. Hydrogenated nitrile rubber having a 43% acrylonitrile content has a solubility parameter of 10.71. These polymers can be readily blended. EPR has a solubility parameter of about 8.1 and EPDM has a solubility parameter of about 8.0. These polymers do not blend readily with nitrile rubber or hydrogenated nitrile rubber. The compatibility between polymers reduces as the difference in the solubility parameters of the respective polymers approaches a value of 0.5 or greater, especially 2 or greater. Accordingly, the present invention relates to a method of blending polymers, which differ in solubility parameter by the value of 0.5 or more and in some instances by 2 or greater.

Because EPR and EPDM display good weather resistance, heat resistance and cold resistance, it is desirable to blend them with polymers that have good physical properties but whose weather resistance, heat resistance and cold resistance are not as good as desired. For example, accessory drive belts in automobiles and trucks, such as alternator belts and the like may be made from nitrile rubber or hydrogenated nitrile rubber. These display good physical properties for these applications. It is desired to increase the temperature range over which these can be used, so that the high temperature demands imposed by summer in Arizona, Nevada and New Mexico, and the low temperature demands imposed by winter in Alaska and Northern Alberta can be satisfied by the same material. In accordance with the present invention EPR or EPDM polymers can be covulcanized with nitrile rubbers or hydrogenated nitrile rubbers.

EPR's are well known. They are commercially available from Bayer under the trademark Buna and include examples bearing the designations EP T 2070 and EP G 5050. EP T 2070 is a copolymer of ethylene and propylene with an ethylene content of 70%, the balance propylene, a Mooney viscosity of 20 and contains no processing oil. EP G 5050 is a copolymer of ethylene and propylene with an ethylene content of 50%, and the balance propylene, a Mooney viscosity of 50 and contains no processing oil. EPR's with or without processing oil can be used in the present invention. However, EPR's without processing oil are preferred.

Terpolymers of ethylene, propylene and ethylidene norbornene are commercially available, for example under the designations EP T 3950, EP T 6470 and EP T 2450. EP T 3950 has a viscosity in Mooney units of 30, a content of ethylidene norbornene of 9%, an ethylene content of 50% and contains no processing oil. EP T 6470 has a Mooney Viscosity of 60, a content of ethylidene norbornene of 4%, an ethylene content of 70% and contains no processing oil. EP T 2450 has a Mooney viscosity of 20, a content of ethylidene norbornene of 4%, an ethylene content of 50% and contains no processing oil. EPDM's with or without processing oil can be used in the present invention however EPDM's without processing oil are preferred. EPDM's with oil contents of 30, 50 and 100 per hundred parts by weight of rubber (phr) are also commercially available.

Nitrile rubbers (NBR's) are copolymers of a conjugated diene and a nitrile. Many conjugated dienes are used in nitrile rubbers and these may all be used in the present invention. Suitable conjugated dienes include 1,3-butadiene, isoprene, 2,3-dimethyl-1,3-butadiene, 1,3-pentadiene and piperylene, of which 1,3-butadiene is preferred.

The nitrile is normally acrylonitrile or methacrylonitrile or α-chloroacrylonitrile, of which acrylonitrile is preferred.

The conjugated diene usually constitutes about 50 to about 85 wt. % of the copolymer and the nitrile usually constitutes about 15 to 50 wt. % of the copolymer. The polymer may also contain an amount, usually not exceeding about 10 wt. %, of one or more other copolymerizable monomers, for example, an ester of an unsaturated acid, such as, ethyl, propyl or butyl acrylate or methacrylate, or a vinyl compound, for example, styrene, α-methylstyrene or a corresponding compound bearing an alkyl substituent on the phenyl ring, for instance, a p-alkylstyrene such as p-methylstyrene. Suitable nitrile rubbers are commercially available under the trademarks PERBUNAN® (Bayer AG) and KRYNAC® (Bayer AG).

Hydrogenated nitrile rubbers (HNBR's) are formed by hydrogenating nitrile rubbers. When a conjugated diene and a nitrile copolymerize, the product of the copolymerization contains carbon-carbon double bonds. These can be hydrogenated in any known manner. Hydrogenation is not always complete, however, and the degree of remaining unsaturation is expressed in terms of residual double bonds, or "RDB", being the number of carbon-carbon double bonds that remain in the copolymer after hydrogenation. The "RDB" is expressed as a percentage of the carbon-carbon double bonds present in the copolymer prior to hydrogenation. Hydrogenated nitrile rubbers are available from Bayer under the trademark THERBAN®, with acrylonitrile contents of 34%, 39% and 43% and with RDB's of 18, 5.5, 3.5 and less than 0.9.

Past attempts to covulcanize an EPR or an EPDM and a nitrile rubber or a hydrogenated nitrile rubber have been unsuccessful. In accordance with the present invention, however, it is possible to covulcanize in the presence of a hydrogenated carboxylated nitrile rubber, a multivalent salt of an organic acid and a vulcanizing agent.

A hydrogenated carboxylated nitrile rubber, and a process for preparing it, are disclosed in WO 01/77185 A1, published on Oct. 18, 2001 the contents of which are incorporated by reference. Preferably, the hydrogenated carboxylated nitrile rubber used in the present invention is in accordance with WO 01/77185 A1. Hydrogenated carboxylated nitrile rubbers, in accordance with WO 01/77185 A1, are commercially available from Bayer under the trademark THERBAN® XT. The amount of the hydrogenated carboxylated nitrile rubber used in accordance with the present invention can vary between wide limits, for example, between 1.0 and 40 parts per hundred parts of rubber (phr), preferably between 5 and 25 phr. The HXNBR is included as part of the rubber.

In the present invention it is preferred that the HXNBR has a nitrile content in the range of about 18 to about 45 wt. %, an acid monomer content in the range of about 0.3 to about 9 wt. %, an RDB not greater than 9.0% and a Mooney viscosity in the range of about 35 to about 120 (ML 1+4'@100° C.). Preferably, in the HXNBR, the nitrile is acrylonitrile, the diene is 1,3-butadiene and the acid is acrylic acid.

Another ingredient used in the present invention is a multivalent salt of an organic acid. Suitable multivalent cations are derived from metals, such as, magnesium, calcium and aluminum. Suitable organic acids include saturated and unsaturated acids having up to 8 carbon atoms, preferably up to 6 carbon atoms. The preferred organic acids are acrylic and methacrylic acids and the preferred salts are zinc diacrylate and zinc dimethacrylate. It is possible to form the salt in situ, but this is not normally preferred. The amount of the salt used can vary between wide limits, for example, between 5 and 80 phr, preferably between 10 and 50 phr.

The vulcanizing agent is preferably a peroxide vulcanizing agent. Suitable organic peroxide crosslinking agents include dicumyl peroxide, di-t-butyl peroxide, benzoyl peroxide 2,5-dimethyl-2,5-di(t-butylperoxy)hexyne-3 and 2,5-dimethyl-2,5-di(benzoylperoxy)hexane and the like. A preferred peroxide curing agent is α,α-bis(tertiarybutylperoxy) diisopropylbenzene, available under the trademark Vulcup 40KE. The peroxide curing agent is suitably used in an amount of about 0.2 to 20 phr, preferably 1 to 10 phr.

Other polymeric materials that can be covulcanized include, for example, ethylene/vinyl acetate copolymers. A suitable ethylene/vinyl acetate copolymer is available from Bayer under the trademark LEVAPREN® (Bayer AG). Mention is also made of ethylene/methylacrylate copolymers available, for instance, from DuPont under the trademark VAMAC® (Du Pont Chemical).

Suitable polymeric materials to be blended in accordance with the present invention include the following:
ethylene-propylene copolymer+NBR
ethylene-propylene copolymer+HNBR
ethylene-propylene copolymer+NBR+HNBR
EPDM+NBR
EPDM+HNBR
EPDM+NBR+HNBR
EPDM+ethylene-vinyl acetate copolymer
EPDM+NBR+ethylene/vinyl acetate copolymer
EPDM+HNBR+ethylene/vinyl acetate copolymer
EPDM+ethylene/methyl acrylate copolymer
EPDM+NBR+ethylene/methyl acrylate copolymer
EPDM+HNBR+ethylene/methyl acrylate copolymer.

The ratio of the two polymeric materials to be covulcanized can vary over wide limits, from about 90:10 to about 10:90. The ratio will depend upon the properties of the individual polymers and the desired properties of the covulcanized product. Some experimentation of a routine nature may be required to arrive at optimum proportions. Usually the ratio will be in the range from 80:20 to 20:80 and for some purposes ratios of 50:50 may be appropriate. If a third or a fourth polymeric material is present, it is anticipated that each material will be present in an amount of at least 10 phr.

The methods of the present invention can be carried out by mixing the various ingredients, initially at room temperature. Another factor that influences the covulcanization process is the speed at which the polymeric materials cure. It is desirable that the polymeric materials cure at about the same speed; otherwise it is possible that substantially all of the one polymeric material will cure before any significant curing of the other polymeric material occurs. In such a case, little or no covulcanization will occur. Curing speed can be controlled to some extent by selection of the polymeric material. For example, EPDM's with a higher content of ethylidene norbornene cure more quickly than EPDM's with a low content. If it is desired to accelerate the curing of EPDM, an EPDM with a higher content of ethylidene norbornene is used. Conversely, if it is desired to slow the curing rate an EPDM with lower content of ethylidene norbornene is used. HNBR's with low RDB cure more slowly than those with high RDB, so if accelerated curing is required an HNBR with a higher RDB is used, and vice versa.

The compositions of the present invention may also include known compounding ingredients such as reinforcing fillers, for example carbon black, calcium carbonate, silica, clay or talc, antioxidants, plasticizers, processing oils processing aids, waxes, antiozonants, antidegradants, ultra violet absorbers, co-agents, and the like.

The compositions of the present invention find many applications including, for example in accessory drive belts such as alternator drive belts for automobiles and trucks, and also in seals particularly for low temperature applications.

The invention is further illustrated in the following examples.

EXAMPLES

Example 1

Six runs were carried out, four comparatives and two in accordance with the present invention. In Run 1, an EPDM (BUNA EP T 6470 (EPDM 847X)) was the sole elastomer that was admixed and cured with zinc diacrylate (Sartomer 633) and a peroxide curing agent (Vulcup 40KE). Run 2 was identical, except that the sole elastomer was a hydrogenated nitrile rubber (THERBAN® C 3446). Run 3 was identical except that the sole elastomer was an HXNBR, which had a bound acrylonitrile content of 33 wt. %, an acrylic acid monomer content of 5.0 wt. %, and the balance 1,3-butadiene, an RDB of 3.5% and a Mooney viscosity of 77 (ML 1+4'@100° C.). Run 4 was identical, except that the elastomer was a 50:50 mixture of BUNA EP T 6470 (EPDM 847X) and THERBAN® C 3446.

Runs 5 and 6 were in accordance with the present invention. In Run 5 the elastomer was a mixture of 40 parts BUNA EP T 6470 (EPDM 847X) 40 parts THERBAN® C 3446 and 20 parts of an HXNBR. In Run 6 the elastomer was a mixture of 50 parts BUNA EP T 6470 (EPDM 847X), 30 parts THERBAN® C 3446 and 20 parts of an HXNBR. Compositions, mixing conditions and results in moving die rheometer, stress strain and Gehman low temperature stiffness tests are given in Table 1.

TABLE 1

MIXING CONDITIONS

MIXER: 6 × 12 inch Mill (Capacity: 1000)
Set to 30° C.
MIXING INSTRUCTIONS

0'- Band rubber. Make ¾ cuts.
2'- slowly add "1B" (SR633); make ¾ cuts.
8'- slowly add "1C"; make ¾ cuts.
11'- remove and refine (6 passes).

MOVING DIE RHEOMETER (MDR) CURE CHARACTERISTICS 1.7 HZ 0.5° arc 170° C., 30 min,
200 dNm

| COMPO-NENTS | RUN | | | | | |
|---|---|---|---|---|---|---|
| | 1 | 2 | 3 | 4 | 5 | 6 |
| BUNA EP T 6470 (EPDM 847X) | 100 | | | 50 | 40 | 50 |
| THERBAN C 3446 | | 100 | | 50 | 40 | 30 |
| HXNBR | | | 100 | 0 | 20 | 30 |
| SARTOMER 633 (SR 633) | 30 | 30 | 30 | 30 | 30 | 30 |
| VULCUP 40KE | 5 | 5 | 5 | 5 | 5 | 5 |
| MH (dN.m) | 54.7 | 29.94 | 46.37 | 43.06 | 63.11 | 67.72 |
| ML (dN.m) | 0.9 | 0.62 | 1.46 | 0.73 | 1.03 | 1.14 |
| Delta MH-ML (dN.m) | 53.8 | 29.32 | 44.91 | 42.33 | 62.08 | 66.59 |
| ts 1 (min) | 0.96 | 0.92 | 1.02 | 0.99 | 1.08 | 1.12 |
| t' 50 (min) | 2.18 | 2.40 | 1.44 | 2.34 | 2.17 | 2.18 |
| t' 90 (min) | 8.26 | 9.54 | 4.58 | 9.03 | 7.83 | 7.50 |
| STRESS STRAIN (DUMBELLS) | | | | | | |
| Cure time at 170° C., (min) | 15 | 17 | 12 | 16 | 15 | 15 |

TABLE 1-continued

| | | | | | | |
|---|---|---|---|---|---|---|
| Tested @ 23° C. | | | | | | |
| Stress @ 100 (MPa) | 6.15 | 14.40 | 9.90 | 5.36 | 8.60 | 9.37 |
| Stress @ 200 (MPa) | | 10.90 | 19.81 | 13.15 | 17.16 | 18.09 |
| Stress @ 300 (MPa) | | 21.96 | 37.05 | | | |
| Ultimate Tensile (MPa) | 12.04 | 29.13 | 38.75 | 19.52 | 21.97 | 20.35 |
| Ultimate Elongation (%) | 165 | 351 | 319 | 255 | 243 | 221 |
| Hard. Shore A2 Inst. (pts.) | 69 | 67 | 79 | 72 | 81 | 82 |
| GEHMAN LOW TEMP STIFFNESS | | | | | | |
| Cure time @ 170° C. (min) | 15 | 17 | 12 | 16 | 15 | 15 |
| Start Temperature: −60° C. | | | | | | |
| Temperature @ T2 (° C.) | −9 | −17 | −11 | −9 | −13 | −13 |
| Temperature @ T5 (° C.) | −25 | −22 | −17 | −22 | −22 | −23 |
| Temperature @ T10 (° C.) | −32 | −23 | −19 | −24 | −25 | −27 |
| Temperature @ T100 (° C.) | −60 | −30 | −41 | −39 | −55 | −60 |

According to the moving die rheometer test, Runs 5 and 6, prepared in accordance with the present invention, had a high Delta MH-ML, which suggests that crosslinking is occurring. In the stress strain tests the ultimate tensile strength, ultimate elongation and Shore hardness of the products of Runs 5 and 6 are markedly superior to that of EPDM alone, and in the Gehman low temperature stiffness test the products of Runs 5 and 6 are markedly superior to hydrogenated nitrile rubber alone. The products prepared according to the present invention are superior in physical properties to EPDM alone and are superior in low temperature properties to hydrogenated nitrile rubber alone.

Example 2

Runs 7 to 10 were carried out in similar manner to Example 1, but using BUNA EP T 3950 (EPDM 585) as the EPDM. Run 7 is comparative, with the EPDM as the sole elastomer. Run 8 is comparative, the elastomer being a 50:50 blend of the EPDM and THERBAN® C 3446, with no HXNBR. Runs 9 and 10 are in accordance with the present invention, Run 9 with 40 parts EPDM, 40 parts THERBAN® C 3446 and 20 parts of the HXNBR and Run 4 with 50 parts EPDM, 30 parts THERBAN® C 3446 and 20 parts of the HXNBR. The mixing conditions were the same as in Example 1. Compositions and results are given in Table 2.

TABLE 2

| | RUN | | | |
|---|---|---|---|---|
| | 7 | 8 | 9 | 10 |
| COMPONENTS | | | | |
| BUNA EPT 3950 (EPDM 585) | 100 | 50 | 40 | 50 |
| THERBAN C 3446 | | 50 | 40 | 30 |
| HXNBR | | 0 | 20 | 20 |

TABLE 2-continued

| | RUN | | | |
|---|---|---|---|---|
| | 7 | 8 | 9 | 10 |
| SARTOMER 633 | 30 | 30 | 30 | 30 |
| VULCUP 40KE | 5 | 5 | 5 | 5 |
| MDR CURE CHARACTERISTICS 1.7 Hz, 0.5° arc, 170° C., 30 min, 200 dNm | | | | |
| MH (dN.m) | 66.07 | 44.53 | 65.13 | 69.75 |
| ML (dN.m) | 0.51 | 0.53 | 0.80 | 0.80 |
| Delta MH-ML (dN.m) | 65.56 | 44.00 | 64.33 | 68.95 |
| ts 1 (min) | 1.13 | 1.08 | 1.16 | 1.21 |
| t' 50 (min) | 3.48 | 2.83 | 2.53 | 2.60 |
| t' 90 (min) | 10.85 | 10.43 | 8.90 | 9.06 |
| STRESS STRAIN (DUMBELLS) | | | | |
| Cure Time at 170° C., (min) Tested @ 23° C. | 18 | 17 | 16 | 16 |
| Stress @ 100 (MPa) | 11.05 | 6.71 | 9.12 | 10.45 |
| Stress @ 200 (MPa) | | 16.29 | 18.19 | |
| Stress @ 300 (MPa) | | | | |
| Ultimate Tensile (MPa) | 11.51 | 16.42 | 19.60 | 17.24 |
| Ultimate Elongation (%) | 103 | 201 | 213 | 170 |
| Hard. Shore A2 Inst. (pts.) | 77 | 71 | 81 | 81 |
| GEHMAN LOW TEMP STIFFNESS | | | | |
| Cure time @ 170° C. (min) Start Temperature: −60° C. | 18 | 17 | 16 | 16 |
| Temperature @ T2 (° C.) | −30 | −20 | −17 | −18 |
| Temperature @ T5 (° C.) | −34 | −24 | −24 | −25 |
| Temperature @ T10 (° C.) | −36 | −26 | −27 | −30 |
| Temperature @ T100 (° C.) | −51 | −40 | −55 | −55 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for covulcanizing at least two polymeric materials comprising the steps of admixing the polymeric materials, together with a hydrogenated carboxylated nitrile rubber, a multivalent salt of an organic acid and a vulcanizing agent, wherein the polymeric materials are selected from the group of ethylene-propylene copolymer, NBR, HNBR, EPDM, ethylene-vinyl acetate copolymers, ethylene-methyl acrylate copolymer, or mixture thereof.

2. A method according to claim 1 wherein the polymeric materials have solubility parameters that differ by 0.5 $(cal.cm^3)^{1/2}$ or greater.

3. A method according to claim 2 wherein the polymeric materials have solubility parameters that differ by 2$(cal.cm^3)^{1/2}$ or greater.

4. A method according to claim 1 wherein one of the polymeric materials is an ethylene/propylene rubber.

5. A method according to claim 1 wherein one of the polymeric materials is an ethylene-propylene-ethylidene norbornene terpolymer.

6. A method according to claim 1 wherein one of the polymeric materials is a nitrile rubber.

7. A method according to claim 1 wherein one of the polymeric materials is a hydrogenated nitrile rubber.

8. A method according to claim 1 wherein one of the polymeric materials is an ethylene/vinyl acetate copolymer.

9. A method according to claim 1 wherein one of the polymeric materials is an ethylene/methyl acrylate copolymer.

10. A method according to claim 1 wherein an ethylene-propylene-ethylidene norbornene terpolymer and a hydrogenated nitrile rubber are covulcanized.

11. A method according to claim 1 wherein the multivalent salt of an organic acid is zinc diacrylate or zinc dimethacrylate.

12. A method according to claim 1 wherein the vulcanizing agent is a peroxide vulcanizing agent.

13. A method according to claim 1 wherein the hydrogenated carboxylated nitrite rubber is present in from 1.0 to 40 parts by weight per hundred parts by weight of polymers to be covulcanized.

14. A method according to claim 13 wherein the hydrogenated carboxylated nitrite rubber is present in from 5 to 25 parts by weight.

15. A covulcanized composition comprising at least two polymeric materials having solubility parameters that differ by 0.5$(cal.cm^3)^{1/2}$ or greater and that are covulcanized by means of a hydrogenated carboxylated nitrile rubber, a multivalent salt of an organic acid and a peroxide curing agent, wherein the polymeric materials are selected from the group of ethylene-propylene copolymer, NBR, HNBR, EPDM, ethylene-vinyl acetate copolymers, ethylene-methyl acrylate copolymer, or mixture thereof.

16. A composition according to claim 15 wherein one of the polymeric materials is an ethylene-propylene-ethylidene norbornene terpolymer and the other is a nitrite rubber of a hydrogenated nitrile rubber.

17. An accessory drive belt for an automobile composed of a composition according to claim 15.

18. A seal composed of a composition according to claim 15.

* * * * *